UNITED STATES PATENT OFFICE.

ALEXANDER S. McKENZIE, OF NEW YORK, N. Y.

METHOD OF MAKING FOOD PRODUCTS.

994,178. Specification of Letters Patent. Patented June 6, 1911.

No Drawing. Application filed October 6, 1910. Serial No. 585,609.

*To all whom it may concern:*

Be it known that I, ALEXANDER S. MCKENZIE, a citizen of the United States, and residing at New York, in the county of New York and State of New York, have invented certain new and useful Improvements in the Method of Making Food Products, of which the following is a specification, such as will enable those skilled in the art to which it appertains to make and use the same.

This invention relates to food products and it consists in an improved method of making such products from bananas, and the object of the invention is to provide an improved food product designed for use as a beverage like coffee, or a breakfast food, in which case it it used with milk or cream and without cooking.

My improved product is produced from bananas and in order to produce a beverage like coffee, or product from which the beverage can be made, I take ripe bananas or bananas which are at least partially ripe, and after peeling or skinning, the bananas are divided into small parts or blocks of approximately the size of an ordinary coffee bean. This product is then roasted in an oven, and in a manner similar to that of roasting the ordinary coffee bean, and until the divided banana product assumes a dark brown color, after which the said product is ground to produce a substance similar to that of ground coffee.

The method of producing the beverage for use after the banana product has been roasted and ground in the manner described, is similar to that of producing coffee from the ordinary coffee bean, except that my improved product may be boiled for a longer or shorter time as particular tastes may require.

By means of this product a beverage may be produced which, while being pleasant to the taste is also highly beneficial as a food product without producing any deleterious effects.

In order to produce a breakfast food, the method of procedure is very similar to that hereinbefore described. The bananas are first peeled and then divided into thin strips or slices preferably transversely, after which the product thus produced is roasted in an oven until it assumes a light yellowish or brownish color, after which the roasted product is ground in the manner hereinbefore described to produce a granulated or finely divided substance similar to other breakfast foods of this class, and which is eaten with milk or cream without cooking. This process produces a food product which is highly beneficial as such, and which is delightful to the taste and has no deleterious or objectionable effects.

In either of the above cases the ground product may be put in bottles, cans or jars and kept indefinitely or for any desired length of time without any change or form of character, as long as moisture is excluded therefrom.

I am aware that it has been heretofore proposed to make 'a food product from bananas, but in this case the bananas were, first peeled and then dried until all the liquid substances or water was extracted therefrom, said drying being in a furnace or oven, heated to a predetermined degree, after which the bananas were cut into small pieces and then roasted in the manner of roasting coffee, after which, the product thus produced was ground into flour. My invention differs from the foregoing, however, in that there is no preliminary drying or roasting; but with my process bananas are peeled and then sliced or cut into small parts and then roasted, the roasting serving both to extract the liquid substances and to produce a dry roasted product which is then ground to the desired fineness, the result being entirely different from that above described.

Having fully described my invention, what I claim as new and desire to secure by Letters Patent, is:—

The method herein described of producing food product from bananas, said method consisting in first peeling ripe or partially ripe bananas, then dividing the peeled bananas to produce a more or less finely divided product, then roasting the said product until it assumes a brownish color and then grinding the said roasted product.

In testimony that I claim the foregoing as my invention I have signed my name in presence of the subscribing witnesses this 5th day of October, 1910.

ALEXANDER S. McKENZIE.

Witnesses:
C. E. MULREANY,
B. M. RYERSON.